Jan. 1, 1929.                                                                    1,696,969
W. H. PARKER
CLEANING DEVICE FOR MEASURING CYLINDERS
Filed Sept. 27, 1926
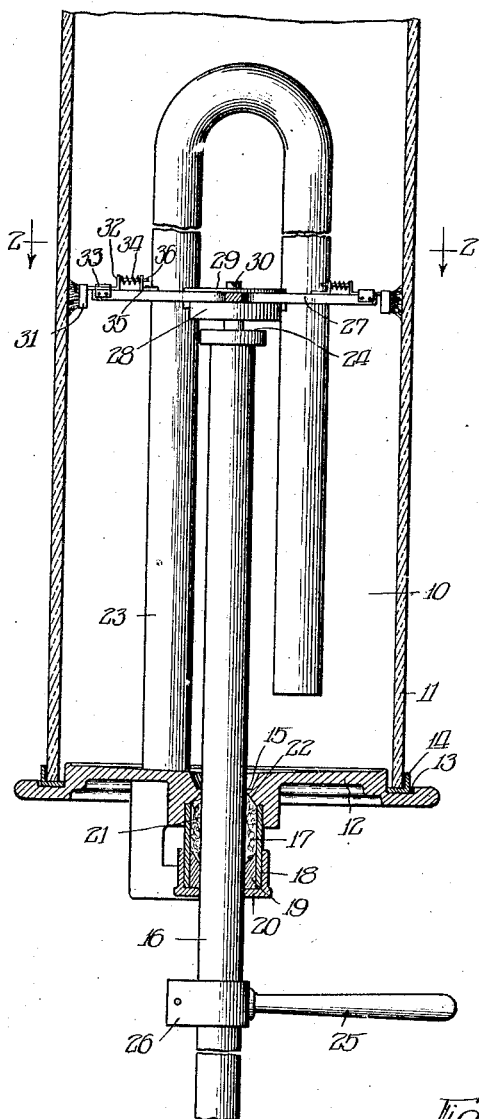
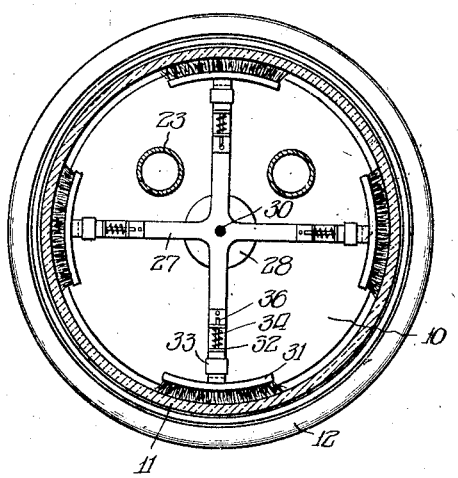
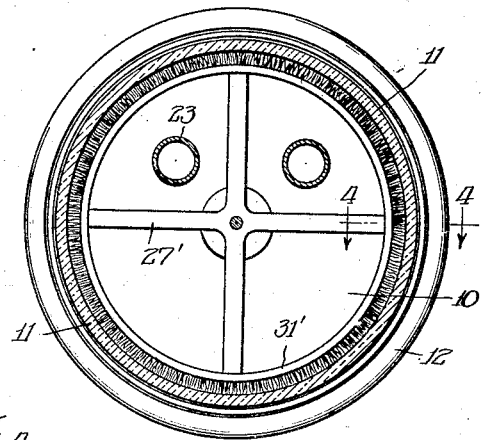
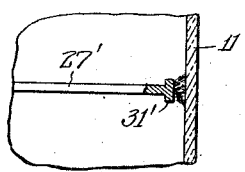
Witness:
R. Burkhardt.
Inventor:
Walter H. Parker,
By Wilkinson, Huxley, Byron & Knight
attys Patented Jan. 1, 1929.

1,696,969

UNITED STATES PATENT OFFICE.

WALTER H. PARKER, OF ROCHESTER, PENNSYLVANIA, ASSIGNOR TO GUARANTEE LIQUID MEASURE COMPANY, OF ROCHESTER, PENNSYLVANIA, A CORPORATION OF DELAWARE.

CLEANING DEVICE FOR MEASURING CYLINDERS.

Application filed September 27, 1926. Serial No. 137,935.

My invention relates to improvements in liquid dispensing devices, and more particularly to the type of dispensing device employing a visible container for measuring quantities of liquid to be dispensed.

My improvement has to do with cleaning means for the walls of the measuring container in a device of the above described type, the cleaning means embodying a brush element mounted for movement in the interior of the container and adapted to rub the internal surface thereof during the procedure of operating the device so that the walls are always maintained free from dirt and foreign matter and clear so that the contents may be readily viewed. Dispensing devices of this type are most commonly used for dispensing gasoline or oils for automotive use although they may be employed with a high degree of usefulness for dispensing any type of fluid, and it has been found that this kind of fluid causes the internal surface of the visible container wall, usually of glass, to become coated and discolored with foreign matter deposited from the fluid to such an extent that a frequent cleaning operation is necessary in order to preserve the visibility of the quantity of fluid contained. It is further customary to provide the container with an inlet pipe and a movable outlet pipe, the elevation of the latter determining the quantity of liquid to be dispensed. The outlet pipe is adjusted to a selected vertical position and the liquid supplied through the inlet pipe to a level slightly above that of the upper end of the outlet pipe, the surplus running out of the outlet, leaving the desired quantity in the reservoir, the extent of which is determined in accordance with the level of the outlet. In this type, during the procedure of manipulating the adjustable outlet, the outlet pipe is raised and lowered within the container.

One of the objects of my invention is to utilize the movement of the outlet pipe during the procedure of manipulating the dispensing device as a means for moving the cleaning brush positioned inside the container.

Another object of my invention is to provide a brush mounted on the upper end of the outlet pipe in a dispensing device of the above described type adapted to contact substantially the entire inner surface of the container wall by the manipulation of the outlet pipe when oscillated and reciprocated in the process of effecting the various adjustments.

Another object of my invention is to provide a spring pressed brush mounted in the interior of the visible container of a dispensing device of the above described type, maintained in contact with the cylinder wall at substantially the same pressure throughout the period of its use irrespective of surface irregularities in the container wall or appreciable wear of the brush.

A further object is to provide a cleaning means for a container whereby the container will be continually cleaned without discontinuing the use of the same.

A still further object is to provide a cleaning device which will at all times during its operation follow the surface to be cleaned, and one which is simple, positive and inexpensive to make and maintain.

With these and various other objects in view, the invention consists of certain novel features of construction and operation as will be more fully described and particularly pointed out in the specification, drawings and claims appended hereto.

In the drawings, wherein like reference characters designate like parts

Figure 1 is a fragmentary sectional side elevation of a container having a transparent wall for measuring the dispensed liquid and its associated parts, the same being equipped with my improved cleaning device;

Figure 2 is a sectional plan view taken substantially on the plane as indicated by the line 2—2 of Figure 1;

Figure 3 is a view similar to Figure 2 but disclosing a modified form of my invention in which an annular brush is employed instead of a plurality of segmental brushes; and Figure 4 is a fragmentary sectional elevation taken substantially on the plane as indicated by the line 4—4 of Figure 3 showing the brush in contact with the cylinder wall, this modification dispensing with the spring mounting.

The various novel features of the invention will be apparent from the following description and drawings and will be particularly pointed out in the appended claims.

Referring to the drawings, it will be noted that my invention is adapted to be applied to a dispensing device employing a transparent container 10 comprising a wall 11 preferably cylindrical in shape and made of glass or any other suitable transparent substance, and a base supporting plate 12 providing a seat as at 13 with the washer 14 for mounting the wall 11. Positioned centrally through the base 12 and in the opening 15 is the outlet pipe 16 slidably mounted through the gland or stuffing box 17 in a manner to prevent leakage from the container. The packing comprises a cylindrical sleeve 18, a packing gland 19, a cap element 20 and the packing material 21 positioned between the gland and the shoulder 22 formed in the opening 15 of the base plate 12. With this arrangement, a tight seal is effected by turning up cap 20 mounted to cause the gland 19 to compress the packing between the gland and a shoulder 22 shown as provided on the base 12.

The container is provided with an inlet pipe 23 which is in the form of an inverted U having its outlet opening in the lower portion of the container. The liquid is supplied to the measuring reservoir by a force pump, fluid pressure or other suitable method, the purpose being to effect a supply within the container 10 slightly above the upper end 24 of the outlet pipe 16. The interior of the container at the top portion thereof may communicate with the atmosphere or may be vented so that when the supply through the inlet is cut off, the surplus runs out of pipe 16 down to the level of the upper end 24 of the outlet pipe. A handle 25 is fixed to the pipe 16 by means of the bracket 26 so that by manipulating the handle the pipe 16 may be oscillated or reciprocated to effect the various adjustments for determining the quantity of liquid to be measured out. It is customary to provide a notched scale positioned adjacent the handle 25 so that when the handle 25 is oscillated, it may be seated in one of the notches provided, each of the notches being so positioned vertically that the handle when positioned in a particular notch causes the upper end 24 of the outlet pipe to be positioned to determine a particular quantity of liquid.

Mounted on the upper end of the tube are arms 27 held on the upper side of the guard plate 28 by means of the bracket 29 and screw 30, the arms 27 extending radially outwardly, disposed at 90° from each other and forming brush supports at their outer ends. The brushes are shown at 31 provided with an L-shaped bracket 32 slidably mounted on the end of the rod through the U-shaped clip 33. A spring 34 is provided for the purpose of pressing the brushes outwardly to contact the inner surface of the container wall, the bracket 35 fixed to the arm 27 forming a supporting abutment for the spring and a guide for the rod 36.

The modification shown in Figure 3 embodies a plurality of radial arms 27' similar to those shown in the other figures but mounted without the pressure springs, the arms being provided at their outer ends with a rim 31' rigidly attached and forming a portion of the annular brush, the bristles of which contact the surface throughout the entire 360°.

In operation, the brush is mounted on the upper end of the pipe 16, as above described, and adjusted so that the spring element 34 maintains the proper contacting pressure between the brush and the container wall. During the procedure of manipulating the dispensing device, it will be necessary in setting the apparatus to measure varying amounts of liquid at various times, to cause the handle and in turn the pipe 16 and the brushes to oscillate and reciprocate, the oscillation serving to release the handle from the above described notches, and the reciprocation causing a new adjustment. The handle having once been released is free to be vertically reciprocated in a manner to effect a new level and adjustment which will in turn effect a reciprocation of the brushes.

In the modification shown in Figure 3, the oscillating operation is not necessary to aid in effecting the surface contact throughout the entire 360°, a mere vertical reciprocation accomplishing the entire surface cleaning operation. It can be readily seen from the description of this device that the small quantity of dirt and foreign matter which by slow accumulation renders the container wall opaque may be removed as fast as it is deposited thus saving a tremendous amount of labor and expense and inconvenience necessary heretofore in keeping the container walls of this character clean and in serviceable condition. In the event of excessive wear on the brushes or irregularities occasioned in the surface of the container wall, the spring device 34 in the modification shown in Figures 1 and 2 will amply compensate for the differences and will maintain the brush in contact with sufficient pressure at all times, the brush being serviceable up until the time the bristles are practically worn out.

It is to be understood that I do not wish to be limited by the exact embodiments shown as other and various modifications will of course readily occur to those skilled in the art.

I claim:

1. In a dispensing device, the combination of a transparent cylinder and wiping elements positioned therein and mounted for reciprocating and oscillating movement, said wiping elements cooperating with means for pressing said elements into contact with the internal surface of said cylinder.

2. A dispensing device including a transparent cylinder, a centrally disposed tube in said cylinder mounted for combined sliding and oscillatory movement, arms on the upper end of said tube having independently mounted wiping elements thereon positioned to contact the internal surface of said cylinder.

3. A dispensing device including a transparent cylinder, a centrally disposed tube in said cylinder mounted for combined sliding and oscillatory movement, radial arms on the upper end of said tube having independently and resiliently mounted wiping elements thereon pressed into intimate engagement with the internal surface of said cylinder, and means external of said cylinder for moving said tube.

4. In a dispensing device, the combination of a reservoir including a transparent cylinder mounted on a base, a centrally disposed overflow tube in said cylinder penetrating said base and mounted for sliding and oscillatory movement, wiping elements independently mounted on the upper end of said tube adapted to contact the internal surface of said cylinder, and means external of said reservoir for moving said tube.

5. In dispensing apparatus, the combination of a measuring chamber, means movably mounted therein for cleaning said chamber, said means including segmental cleaning elements, each element being resiliently mounted on a support and normally urged toward said chamber, and means cooperating with said support for imparting movement to said cleaning elements.

Signed at Rochester, Pennsylvania, this 20th day of September, 1926.

WALTER H. PARKER.